US006758649B1

(12) United States Patent
Scordilis

(10) Patent No.: US 6,758,649 B1
(45) Date of Patent: Jul. 6, 2004

(54) FORK LIFT ATTACHMENT

(76) Inventor: Frank P. Scordilis, 119 Brandermill Rd., Spartanburg, SC (US) 29301

( * ) Notice: Subject to any disclaimer, the term of this patent is extended or adjusted under 35 U.S.C. 154(b) by 3 days.

(21) Appl. No.: 10/442,441

(22) Filed: May 21, 2003

(51) Int. Cl.[7] .................................................. B65G 8/00

(52) U.S. Cl. ....................... 414/665; 414/664; 414/666; 414/11

(58) Field of Search ................................ 414/665, 664, 414/666, 11, 667, 668, 669, 670, 671

(56) References Cited

U.S. PATENT DOCUMENTS

| | | | | | |
|---|---|---|---|---|---|
| 3,106,305 | A | | 10/1963 | Gehring | 214/730 |
| 3,572,530 | A | | 3/1971 | Ohntrup et al. | 217/730 |
| 3,667,633 | A | * | 6/1972 | Cappella | 214/145 |
| 3,672,526 | A | | 6/1972 | Hansen | 214/730 |
| 3,688,818 | A | * | 9/1972 | Domres | 143/46 R |
| 3,738,512 | A | * | 2/1973 | Marsden | 217/730 |
| 3,762,588 | A | | 10/1973 | Hansen et al. | 214/730 |
| 3,984,019 | A | | 10/1976 | Brudi et al. | 214/620 |
| 3,998,345 | A | | 12/1976 | Fiehler et al. | 214/701 |
| 4,218,170 | A | | 8/1980 | Goodacre | 414/666 |
| 4,249,854 | A | * | 2/1981 | Teti | 414/685 |
| 4,335,992 | A | * | 6/1982 | Reeves | 414/667 |
| 4,392,541 | A | * | 7/1983 | Barchard | 180/209 |
| 4,757,712 | A | * | 7/1988 | Jurca | 73/432.1 |
| 5,073,077 | A | | 12/1991 | Altman | 414/11 |
| 6,135,701 | A | * | 10/2000 | Galloway, Sr. | 414/607 |
| 6,279,612 | B1 | * | 8/2001 | Warth | 137/899 |

* cited by examiner

*Primary Examiner*—Christopher P. Ellis
*Assistant Examiner*—Rashmi Sharma
(74) *Attorney, Agent, or Firm*—Charles L. Schwab; Nexsen Pruet LLC

(57) ABSTRACT

A fork lift truck attachment having side shiftable forks which can be adjusted for side loading and which can be tilted fore and aft laterally.

13 Claims, 4 Drawing Sheets

FORK LIFT ATTACHMENT

TECHNICAL FIELD

This invention relates to a fork lift truck attachment having forks which can be shifted laterally relative to a supporting carriage, can be pivoted 90 degrees to either side of a forward position and which can also be adjusted for side tilt and fore and aft tilt.

BACKGROUND OF THE INVENTION

U.S. Pat. No. 3,106,305 issued Aug. 23, 1962 to W. F. Gehring for an Industrial Lift Truck shows a lift truck attachment having forks which can be shifted laterally relative to a carriage and which can be pivoted 90 degrees to either side of a forward position.

U.S. Pat. No. 3,572,530 issued Mar. 30, 1971 to F. F. Ohntrup et al. for an Industrial Truck having forks which can be shifted laterally relative to a carriage, which can be pivoted 90 degrees to either side of a forward position and which can be adjusted for fore and aft tilt.

Fork lift trucks are well known for their ability to handle a wide variety of warehousing jobs. They have also found application in outdoor storage facilities. Their use tends to be restricted to movement of loads over floors and terrain which are relatively level. There are a wide variety of products which may be packaged for outdoor lift truck movement such as bricks, concrete blocks, flat rocks and other landscaping products, heat pumps, roofing, and other building items. Heretofore the use of a fork lift truck was limited because of uneven ground or because the load to be moved was on a different slope than the lift truck as, for instance, when the ground supporting the lift truck is not parallel with a building floor or scaffold.

SUMMARY OF THE INVENTION

This invention permits a fork lift truck to be used for many material handling tasks which were previously beyond its capability. A relatively wide tool support is secured to the lift truck carriage, which is mounted for vertical movement on the mast. A forward extending load arm is slidingly mounted on the tool support and is shiftable laterally by a power actuator. The forward end of the load arm supports a sub frame for pivotal movement by a power actuator about a vertical axis and the sub frame pivotally supports the top of a hinge plate for swinging movement about a horizontal axis disposed forward of the vertical axis, the swinging movement being controlled by an extensible and contractible fluid actuator. The hinge plate pivotally supports a fork mounting wall for pivotal movement about a horizontal axis at right angles to the fork mounting wall and a power actuator is interposed between the hinge plate and the fork mounting wall to selectively pivot the fork mounting wall relative to the hinge plate. This construction allows the lift truck operator to maintain the fork tines in a horizontal plane even though the lift truck may be on a terrain sloping in a fore and aft direction and sloping laterally. This attachment, for instance, permits the lift truck to safely deliver a pallet of construction materials or other construction items to a scaffold even though the support for the lift truck is not parallel to the scaffold floor. This attachment also allows the forks to be adjusted for insertion in a pallet or beneath a load in a manner in which the load or pallet is supported by both forks as it is picked up. Likewise when the support for the load or pallet is on a plane different than the plane of the support for the lift truck, the forks can be adjusted to deposit a load or pallet in a gentle manner.

BRIEF DESCRIPTION OF THE DRAWINGS

One embodiment of the invention is illustrated in the drawings, in which:

FIGS. 8, 9 and 10 are top views illustrating the side shifting and side loading functions of the attachment, which is not shown in full detail.

DETAILED DESCRIPTION OF THE INVENTION

Figure 1:
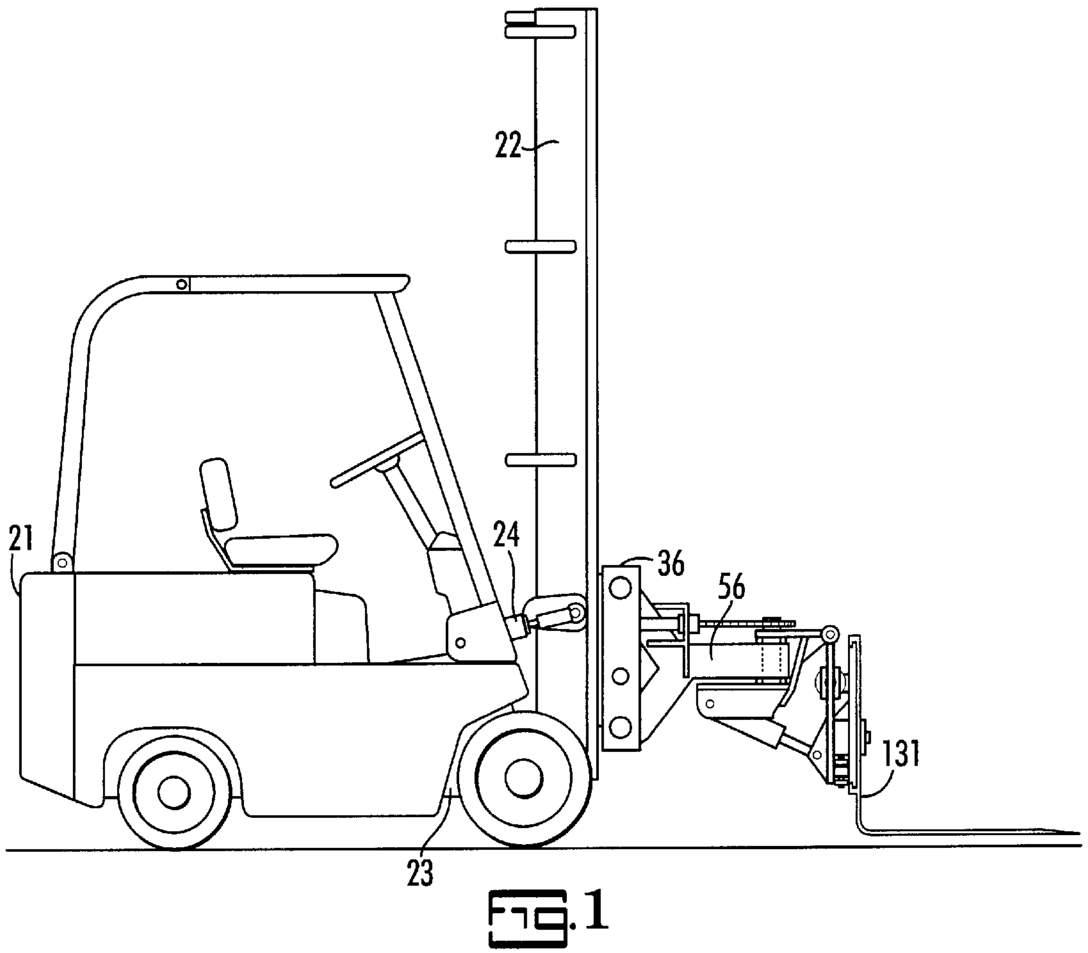
FIG. 1 is a side view of a lift truck and the attachment.
Figure 2:
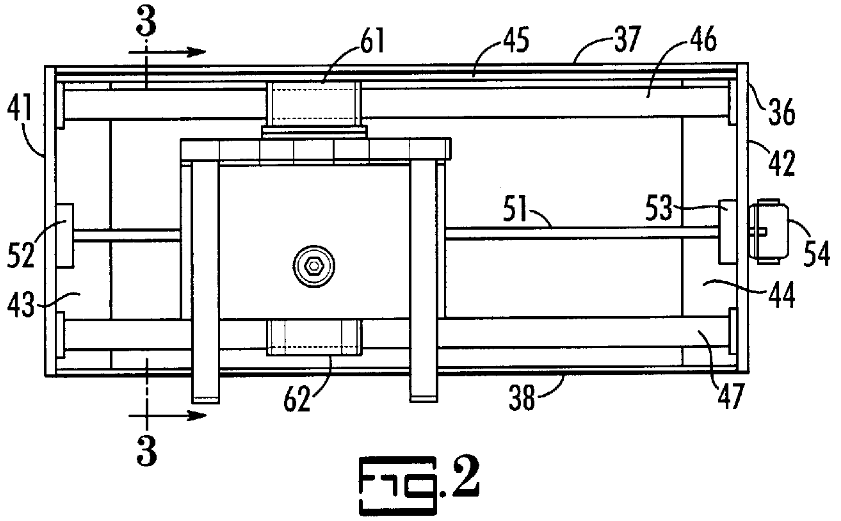
FIG. 2 is a front view of the attachment.
Figure 3:
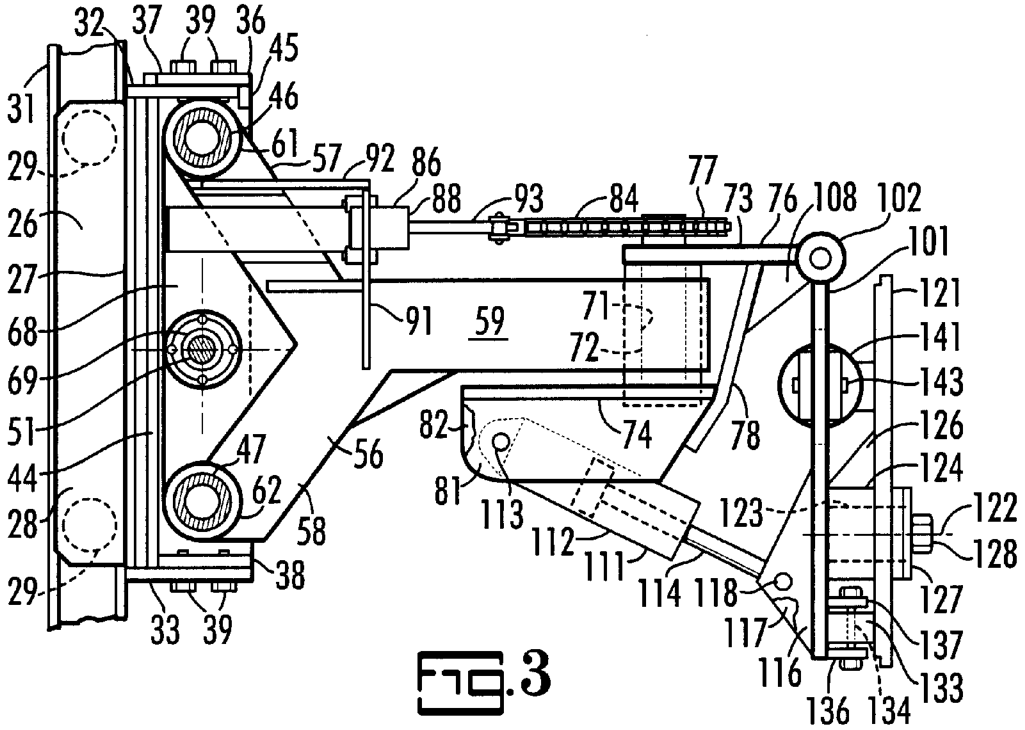
FIG. 3 is a section taken on the line 3—3 in FIG. 2 and also showing parts of the lift truck mast and carriage.
Figure 4:
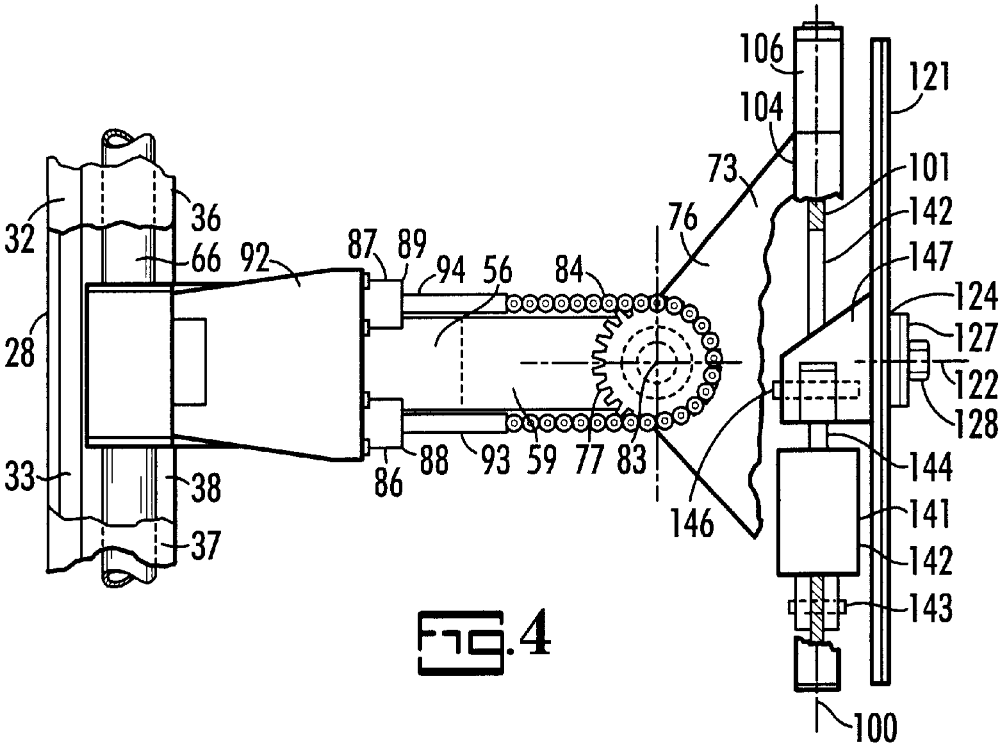
FIG. 4 is a slightly enlarged top view of the attachment with parts broken away for illustration purposes.
Figure 9:
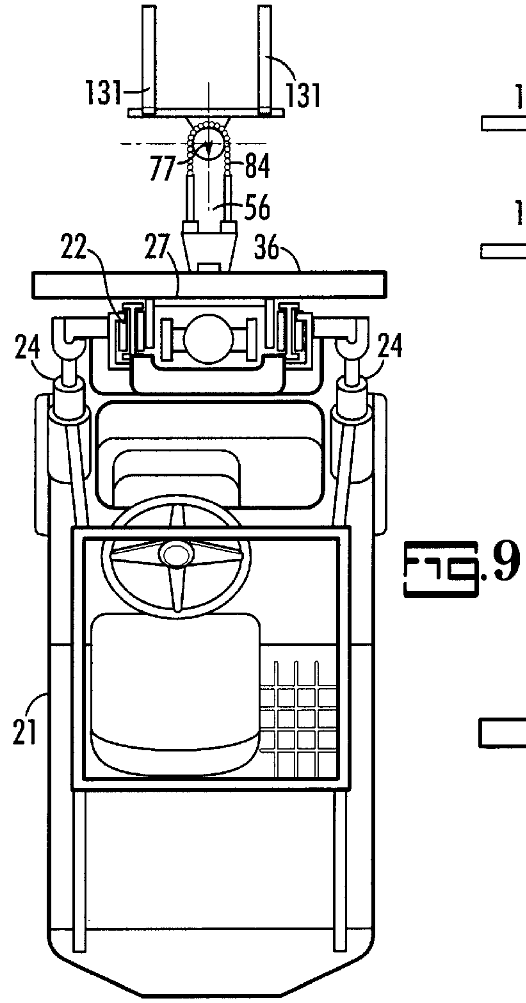

Referring to FIGS. 1–4, a four wheel fork lift truck 21 has a mast 22 pivotally connected at its bottom to the forward end of a chassis 23 for fore and aft tilting about a laterally extending horizontal axis by a pair of double acting hydraulic actuators 24. The mast 22 may include a plurality of nested telescoping sections, as shown in FIG. 9, each having a pair of laterally spaced parallel channels. As shown in FIGS. 3 and 9, a load carrier in the form of a lift truck carriage 26 has a transverse vertical wall 27 from which a pair of flanges 28 extend rearwardly and support rollers 29 engaging the channels 31 of the inner most section of the mast 22. A pair of support plates 32, 33 are welded to the top and bottom of the vertical wall 27 and extend forwardly in supporting relation to a laterally extending tool support 36. The tool support 36 includes parallel upper and lower beams 37, 38 to which the support plates 32, 33 are secured by releasable fastening members in the form of cap screws 39. Corresponding ends of the beams 37, 38 are interconnected by vertical end struts 41, 42 to form a box structure and corner braces 43, 44 are welded to the box structure for rigidity purposes. A lip 45 is welded to the front under side of the upper beam 37 to reduce vertical deflection under load.

A laterally extending pair of parallel slide tubes 46, 47 are disposed one above the other and are securely fastened at their corresponding opposite lateral ends to the end struts 41, 42, respectively. Disposed between, and parallel to, the tubes 46, 47 is a long threaded rod or side shifting screw 51 rotatably supported at its opposite ends by bearing blocks 52, 53 secured to the end struts 41, 42. The screw 51 is driven by a reversible power actuator in the form of a fluid motor 54 mounted on the end strut 42.

Referring also to FIGS. 3–7, a Y-shaped load arm 56 has an upper leg 57, a lower leg 58 and a forwardly extending trunk 59. The legs 57, 57 terminate in cylindrical sleeves 61, 62 having inward facing cylindrical slide bearing surfaces 63, 64 which are in load bearing engagement with the radially outer cylindrical surfaces of the pair of horizontal tubes 46, 47 extending laterally one above the other between the end struts 41, 42. A vertical web 68 welded to the legs 57, 58 nonrotatably supports an internally threaded nut 69 which is in threaded engagement with the side shifting screw 51.

Figure 5:
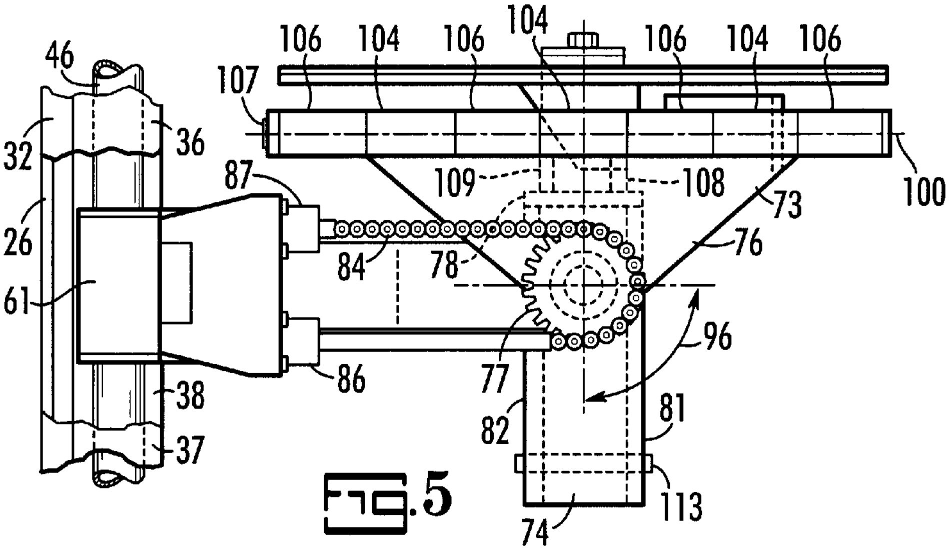
FIG. 5 is a partial top view of the attachment showing the fork support structure pivoted 90° from a straight ahead position.
Figure 6:
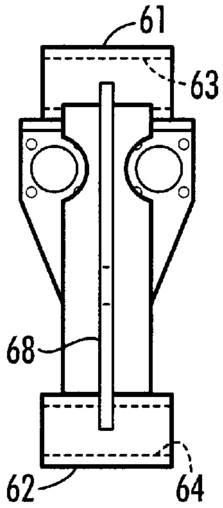
FIG. 6 is an end view of the load arm.
Figure 7:
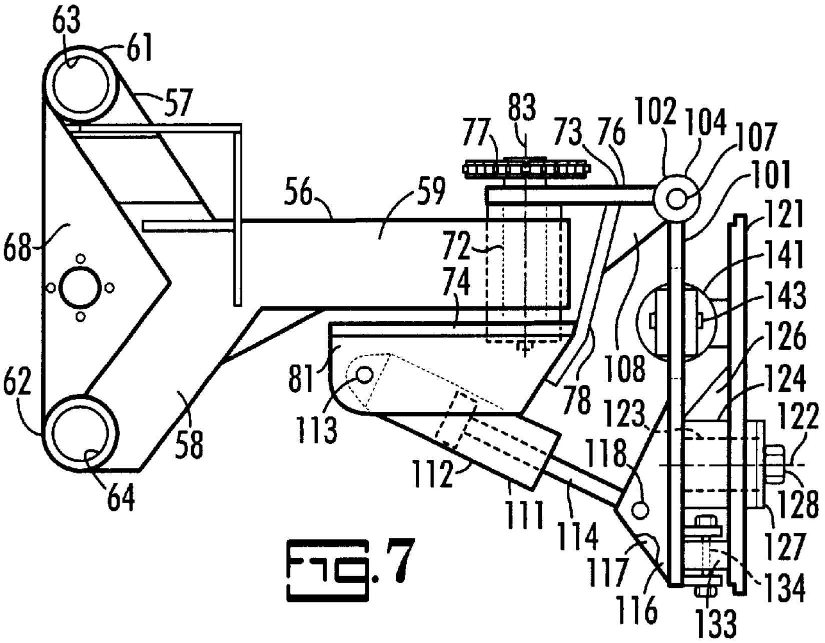
FIG. 7 is a side view of the fork support structure and the load arm removed from lift truck carriage.
Figure 8:
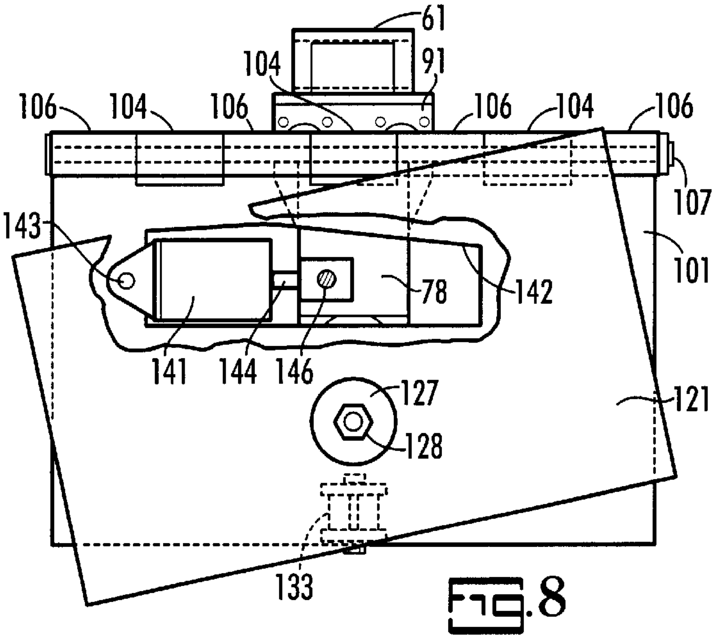
FIG. 8 is a front view of the attachment with parts broken away for illustration purposes and showing the fork support wall tilted laterally.

The forward end of the trunk 59 of the load arm has a vertical cylindrical bore 71 in load bearing engagement with a vertical pivot pin 72 secured at its opposite ends to upper and lower horizontal plates 73, 74 of a subframe 76. The subframe 76 includes a sprocket 77 welded to the upper plate 73 and a downwardly extending plate 78 which is welded at its upper end to the upper plate 73 and is welded at its lower end to the lower plate 74. A pair of parallel vertical walls 81, 82 are welded at their upper ends to the lower plate 74. The subframe 76, including the sprocket 77, is pivotally supported on the subframe for 180 degree pivotal movement about a vertical pivot axis 83. The sprocket 77 and subframe 76 are pivoted by a link chain 84 engaging the sprocket 77. The sprocket is rotated by linear power actuators in the form of a pair of fluid actuators 86, 87 having cylinders 88, 89 which are bolted to a vertical bracket 91 which is welded to the load arm 56 and braced by a horizontal plate 92. The actuators 86, 87 include piston rods 93, 94 whose exterior ends are connected to the opposite ends of the sprocket chain 84. As shown in FIG. 5, extension of actuator 86 and retraction of actuator 87 pivots the subframe 76 by an angle 96 in the amount of 90 degrees. The actuators 87, 88 can be operated to adjust the pivot position of the subframe 76 between 90 degrees to the left and 90 degrees to the right of its forward position, as shown in FIGS. 1, 3, 4 and 7.

A vertically extending hinge plate 101 is connected at its upper end to the front end of the subframe 76 by a piano hinge 102. The piano hinge 103 includes annuli 104 welded to the upper plate 73 of the subframe 76, annuli 106 welded to the top of the hinge plate 101 and a hinge pin 107 extending through the annuli 104, 106. A pair of gussets 108, 109 are welded to the plate 78, to the plate 73 and to the central annulus 104. The hinge plate 101 is pivoted about the horizontal axis 100 of the piano hinge 102 by a linear fluid power actuator 111 having a cylinder 112 pivotally connected to the walls 81, 82 by a pin 113 and a rod 114 pivotally connected to by a pin 118 a pair of flanges 116, 117 welded to the rear of the hinge plate 101. The hinge plate 101 can be pivoted about 12 degrees in either direction from its normal position which is illustrated in FIG. 3. In this normal position the tines of the forks 131 are parallel to the support for the lift truck 21 when the mast 22 is in its illustrated vertical position.

A fork mounting wall 121 is pivotally connected to the front of the hinge plate 101 on an axis 122 perpendicular to the wall 121 by a pivot connection which includes a pin 123 welded to the hinge plate 101 and a sleeve 124 welded to the fork mounting wall 121 and reinforced by a gusset 126 between the wall 121 and the sleeve 124. The sleeve 124 is maintained on the pin 123 by a washer 127 and a cap screw 128 threaded into an internally threaded central bore, not shown, in the pin 123. When the forks 131, such as shown in FIGS. 1 and 9–11 are transporting a load, the cylindrical bearing surfaces of the pin 123 and the sleeve 124 are subjected to uneven loading. In order to alleviate the uneven loading on those bearing surfaces, a thrust roller 133 is rotatably mounted on a vertical axis on the hinge plate 101 below the pin 123 by a pin 134 supported on a pair of brackets 136, 137.

Lateral tilting of the fork mounting wall 121 about the axis 122 is controlled by a double acting fluid power actuator 141 disposed in an opening 142 in the hinge plate 102. The actuator 141 has a cylinder 142 pivotally connected to the hinge plate by a pin 143 and a rod 144 pivotally connected by a pin 146 to a pivot block 147 welded to the back side of the fork mounting wall 121. The fork mounting wall 121 can be tilted about 12 degrees to either side of its normal position shown in FIG. 2.

Figure 10:
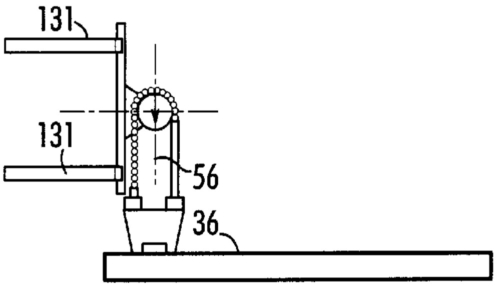
Figure 11:
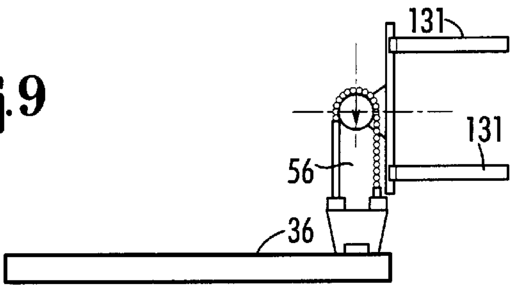

The attachment shown in FIGS. 9, 10 and 11 does not include the hereinbefore described components for tilting the fork mounting wall in a fore and aft direction or laterally. These three figures illustrate the attachment's lateral side shifting capability and the 180 degree range of pivotal swinging movement of the forks 131 between laterally opposite positions.

When a fork lift truck is used even terrain such as encountered in construction sites and unpaved outdoor storage sites, the lift truck may be supported on a different plane than the supported plane for the load being picked up or deposited. For instance the plane of the support for the load may be skewed in both a fore and aft direction and a lateral direction in relation to the lift truck. In such circumstances the load may slide off the forks causing damage and or personal injury. The attachments of this invention permits the tines of the forks to be tilted about a pair of axes which are in planes disposed perpendicular to one another. This capability greatly increases the unity of the lift truck or loader using the herein described attachment.

What is claimed is:

1. An attachment for a material handling vehicle having an elevatable load carrier at its forward end, comprising:

a laterally extending tool support on said load carrier, a load arm extending forwardly of said tool support and mounted on said tool support for lateral shifting movement between the laterally opposite ends of said tool support, a first power means interposed between said tool support and said load carrier operable to shift said load arm laterally relative to said tool support, a subframe pivotally connected to the forward end of said load arm on a vertical axis for 90 degree swinging movement in both lateral directions from a forward extending position of said subframe, second power means between said load arm and said subframe operable to pivot said subframe 180 degrees between laterally opposite positions, a vertically extending hinge plate having its upper end pivotally connected to said subframe on a first horizontal axis extending laterally when said subframe is in said forwardly extending position, a third power means interposed between said subframe and said hinge plate operable to pivot said hinge plate about said first horizontal axis, a fork mounting wall disposed in front of and pivotally connected to said hinge plate on a second horizontal axis perpendicular to said wall, said fork mounting wall being adapted to support material handling forks at its front side and fourth power means interposed between said hinge plate and said fork mounting wall operable to pivot said fork mounting wall relative to said hinge plate about said second horizontal axis.

2. The attachment of claim 1 having a thrust roller interposed between said hinge plate and said fork mounting wall below said second horizontal axis.

3. The attachment of claim 2 wherein said thrust roller is mounted on said hinge plate and is in rolling thrust transmitting relation to a lower rear portion of said fork mounting wall.

4. The attachment of claim 1 wherein said subframe is pivotally connected to said load arm by a pivot structure including an upper part of said subframe disposed above said load arm and a lower part disposed below said load arm, said third power means being a double acting fluid actuator having cylinder and piston rod components, one of said components being pivotally connected to said lower part of said subframe and the other of said components being pivotally connected to said hinge plate.

5. The attachment of claim 4 wherein said hinge plate is pivotally connected to said subframe by a piano hinge.

6. The attachment of claim 1 wherein said hinge plate is pivotally connected to said subframe by a piano hinge.

7. The attachment of claim 1 wherein said fourth power means includes a double acting fluid actuator have cylinder and rod elements, one of said elements being connected to said hinge plate and the other of said elements being connected to said fork mounting wall.

8. The attachment of claim 1 wherein a load carried by forks mounted on said fork mounting plate can be maintained on a level plane even though said vehicle is on a support surface skewed in two planes.

9. The attachment of claim 1 wherein each of said forks has an upright leg and a tine extending at right angles from the bottom of said leg said tines being positionable by operation of said power means to place both tines in engagement with the bottom of a transportable item when said vehicle and said item are supported on planes which are skewed relation to one another in a fore and aft direction and in a lateral direction.

10. The attachment of claim 1 wherein said tool support includes a pair of vertically spaced horizontal cylindrical tubes and said load arm includes upper and lower sleeves slidingly supported respectively on said tubes.

11. The attachment of claim 10 wherein said tool support includes a pivotably mounted horizontal screw connected in driven relation to said first power means and said load arm includes an internally threaded member nonrotatable secured to said load arm and in threaded engagement with said screw.

12. The attachment of claim 11 having a sprocket nonrotatably secured to the top of said subframe, a sprocket chain meshing with said sprocket and presenting opposite ends and a pair of fluid powered linear actuators having cylinders secured to said load arm and rods secured, respectively, to said ends of said chain.

13. An attachment for a fork lift truck having a mast on its forward end on which a carriage is mounted for vertical movement, said attachment comprising a laterally extending tool support secured to said carriage, a load arm extending forwardly of said tool support and mounted thereon for lateral movement between its laterally opposite ends, a subframe pivotally connected to the forward end of said load arm on a vertical axis for lateral swinging movement in both lateral directions from a forward extending position of said subframe, power means interposed between said load arm and said subframe operable to effect said swinging movement of said subframe 180 degrees relative to said load arm, a vertically disposed hinge plate pivotally connected to said subframe on a first horizontal axis spaced forwardly of said vertical axis when said subframe is in said forward extending position, power means interposed between said subframe and said hinge plate operable to pivot said hinge plate about said first horizontal axis, a fork mounting wall pivotally connected to said hinge plate on a second horizontal axis perpendicular to said wall and power means interposed between said hinge plate and said fork mounting wall operable to pivot said fork mounting wall relative to said hinge plate about said second horizontal axis.

* * * * *